(12) United States Patent
Yang et al.

(10) Patent No.: US 12,270,730 B2
(45) Date of Patent: Apr. 8, 2025

(54) INTEGRATED AUTOMATIC DETECTION EQUIPMENT FOR HIGHWAY NETWORK STRUCTURE GROUP

(71) Applicants: Chongqing University, Chongqing (CN); Chongqing Transportation Planning and Technology Development Center, Chongqing (CN)

(72) Inventors: Yang Yang, Chongqing (CN); Xiaojun Shen, Chongqing (CN); Kanghui Luo, Chongqing (CN); Hanqing Zhao, Chongqing (CN); Wenqi Yang, Chongqing (CN); Hui Wang, Chongqing (CN); Song Wang, Chongqing (CN); Changqing Liu, Chongqing (CN); Binglin Jiang, Chongqing (CN); Zhen Wang, Chongqing (CN); Zhigang Wu, Chongqing (CN); Qiang Wei, Chongqing (CN); Rui Sun, Chongqing (CN); Wanqin Li, Chongqing (CN)

( * ) Notice: Subject to any disclaimer, the term of this patent is extended or adjusted under 35 U.S.C. 154(b) by 759 days.

(21) Appl. No.: 17/505,650

(22) Filed: Oct. 20, 2021

(65) Prior Publication Data
US 2022/0120632 A1   Apr. 21, 2022

(30) Foreign Application Priority Data

Oct. 20, 2020  (CN) .......................... 202011124176.X

(51) Int. Cl.
G01M 5/00   (2006.01)
G01M 7/08   (2006.01)
(Continued)

(52) U.S. Cl.
CPC ............ G01M 5/0008 (2013.01); G01M 7/08 (2013.01); G01S 17/86 (2020.01); G01S 17/894 (2020.01);
(Continued)

(58) Field of Classification Search
CPC ..... G01M 5/0008; G01M 7/08; G01S 17/894; G01S 7/4802; G01S 17/86; G01S 17/931;
(Continued)

(56) References Cited

U.S. PATENT DOCUMENTS 5,835,053 A * 11/1998 Davis .................. G01S 13/0209
                                                           342/22
8,797,828 B1 * 8/2014 Lev ........................ G01V 1/162
                                                          356/497
(Continued)

FOREIGN PATENT DOCUMENTS

| CN | 101713167 A | 5/2010 |
| CN | 107356609 A | 11/2017 |

(Continued)

OTHER PUBLICATIONS

Júlio César de Moraes Fernandes, Marcos Silveira, José Manoel Balthazar (Stochastic Analysis of 1-DOF Vehicle Suspension System Employing Asymmetrical Damping) (Year: 2017).*

*Primary Examiner* — Farhana A Hoque
*Assistant Examiner* — Joseph O Nyamogo
(74) *Attorney, Agent, or Firm* — Sandy Lipkin

(57) ABSTRACT

Integrated automatic detection equipment includes a tractor, a first test vehicle and a second test vehicle. A central control system, a geometric linear detection system, a road three-dimensional (3D) detection system, and a laser 3D scanning system are arranged on the tractor. A front end of the first test vehicle is detachably connected to a rear end of the tractor, and a rear end of the first test vehicle is detachably con- (Continued)

nected to a front end of the second test vehicle. A drop hammer loading system is arranged on the first test vehicle. A bridge dynamic detection system is arranged on the second test vehicle. The geometric linear detection system, the road 3D detection system, and the drop hammer loading system are used for a road detection.

9 Claims, 7 Drawing Sheets

(51) Int. Cl.

| | | |
|---|---|---|
| *G01S 7/48* | (2006.01) | |
| *G01S 17/86* | (2020.01) | |
| *G01S 17/894* | (2020.01) | |
| *G01S 17/931* | (2020.01) | |
| *G06T 7/521* | (2017.01) | |
| *G06V 20/56* | (2022.01) | |
| *G08G 1/01* | (2006.01) | |
| *H04N 13/243* | (2018.01) | |

(52) U.S. Cl.
CPC ............ *G01S 17/931* (2020.01); *G06T 7/521* (2017.01); *G06V 20/56* (2022.01); *G08G 1/0112* (2013.01); *G08G 1/0125* (2013.01); *G08G 1/0129* (2013.01); *H04N 13/243* (2018.05); *G01S 7/4802* (2013.01); *G06T 2200/04* (2013.01); *G06T 2207/10028* (2013.01); *G06T 2207/30252* (2013.01)

(58) Field of Classification Search
CPC ................. G06T 7/521; G06T 2200/04; G06T 2207/10028; G06T 2207/30252; G06V 20/56; G08G 1/0125; G08G 1/0112; G08G 1/0129; H04N 13/243; G01D 21/02
See application file for complete search history.

(56) References Cited

U.S. PATENT DOCUMENTS

| | | | | |
|---|---|---|---|---|
| 2010/0052971 | A1* | 3/2010 | Amarillas | ............. G01S 13/862 342/22 |
| 2013/0082857 | A1* | 4/2013 | Beer | ...................... G01S 13/885 342/22 |
| 2013/0086215 | A1* | 4/2013 | Trotta | ................... H04L 69/329 709/217 |
| 2016/0350907 | A1* | 12/2016 | Simula | .................... B60R 11/04 |

FOREIGN PATENT DOCUMENTS

| | | |
|---|---|---|
| CN | 110633855 A | 12/2019 |
| CN | 111368423 A | 7/2020 |

\* cited by examiner

INTEGRATED AUTOMATIC DETECTION EQUIPMENT FOR HIGHWAY NETWORK STRUCTURE GROUP

CROSS REFERENCE TO THE RELATED APPLICATIONS

This application is based upon and claims priority to Chinese Patent Application No. 202011124176.X, filed on Oct. 20, 2020, the entire contents of which are incorporated herein by reference.

TECHNICAL FIELD

The present disclosure belongs to the technical field of road-bridge-tunnel detection, and in particular, relates to integrated automatic detection equipment for a highway network structure group.

BACKGROUND

At this stage, automatic detection equipment for roads, bridges, and tunnels is used for different purposes by different detection methods, resulting in less correlation between the detection fields, and there is no universal method that can simultaneously carry out road-bridge-tunnel integrated detection. Although a lot of research has been carried out on the automatic detection methods and equipment research and development of roads, bridges and tunnels, the research in this field around the world is at the initial stage in the road-bridge-tunnel integrated automatic detection system.

The construction of a large number of road facilities and financial constraints have brought huge challenges to the safe operation and scientific management of traffic facilities. Road-bridge-tunnel rapid detection, data analysis and safety evaluation are the prerequisites for scientific facility management. The design, detection, evaluation, maintenance and repair of highway systems and urban roads are based on general specifications. In view of the fact that the non-standard and special vehicles involved in professional transportation are very different from ordinary vehicles, for the road design that meets the driving safety of ordinary vehicles, safety risks may exist in professional transportation. Due to the difference in driving path and OD distribution, the road maintenance level that meets ordinary needs and traffic distribution is also inconsistent with professional transportation needs. Therefore, from various perspectives such as design, management and maintenance, the detection and evaluation of ordinary road facilities and bridge and tunnel structures cannot meet the needs of professional transportation.

There is a problem I that the current carrying capacity of the facility structure does not meet the needs of professional transportation, which may cause serious safety incidents. Specialized transportation vehicles are mostly non-standard vehicles, and heavy-duty vehicles with multiple axles frequently appear. However, the conventional bridge load test and regular detection methods are based on standard vehicles, and cannot be used to judge whether it is safe for the professional transportation motorcade with heavy load and non-standard vehicles to cross the bridge. Therefore, in view of the needs of professional transportation, it is necessary to make a conclusion on whether it is safe to cross the bridge based on the rapid diagnosis method and suggestions for rapid reinforcement and maintenance.

There is a problem II that for special vehicles, driving safety cannot be evaluated based on existing safety standards. The driving safety-related model based on the ordinary road alignment design is based on standard vehicles. Safety standards may be invalid for non-standard special vehicles (extra-long, overweight, multi-axles, etc.), especially when the superimposed road surface friction decreases, damage occurs, etc., which may cause more serious safety risks such as rollover and side slip. Moreover, the deviation of the center of gravity of the transport vehicle may also affect driving safety, and it also needs to be parameterized so as to evaluate the driving safety. Therefore, it is necessary to quickly detect the large-scale deformation and damage, surface condition and alignment of the operating road, as well as the geometric center of gravity parameters of the transportation vehicles, and establish a set of driving safety evaluation methods for professional transportation vehicles.

There is a problem III that professional transportation is blocked due to the instability of road-bridge-tunnel capacity. In view of the actual operation of road-bridge-tunnel facilities, due to structural maintenance, pipeline installation, increased traffic safety facilities, and inadequate management, the space occupation of road sections or bridge decks and the reduction of tunnel clearance may be caused, and due to the cargo transportation of special vehicles and the travel space requirements of non-standard heavy vehicles, the travel of special vehicles is blocked. If detection, evaluation and early warning are not carried out in time, and relevant measures are not taken, professional assets may be damaged and even safety accidents may occur.

There is a problem IV of timeliness issues of road-bridge-tunnel safety evaluation. Ordinary road-bridge-tunnel safety evaluations are often based on long-term, periodic detection and evaluation, for example, the annual safety appraisal report, the relevant appraisal basis and guiding theories are also based on the long-term safety, applicability and durability model. The needs of special vehicle teams are different, the transportation tasks of professional transport vehicles are temporary and sudden, on the one hand, real-time capacity evaluation is required, on the other hand, it is necessary to provide short-term (such as within 1 month) road-bridge-tunnel safety evaluation conclusions. Therefore, its safety indexes, related thresholds and guidelines should be studied based on real-time/short-term safety considerations.

In summary, integrating road-bridge-tunnel non-destructive testing technology and developing an integrated automatic detection and evaluation system is the fundamental way to solve this problem.

SUMMARY

In view of the above-mentioned shortcomings in the prior art, the present disclosure provides integrated automatic detection equipment for a highway network structure group, which realizes road-bridge-tunnel data integration, human-computer interaction design of an acquisition interface, real-time analysis of key indexes, and output of treatment plans, completes short-term safety evaluation based on relevant indexes of roads, bridges and tunnels, provides reinforcement measures, and establishes a road-bridge-tunnel detection data accumulation mechanism in terms of long-term management.

In order to solve the above technical problems, the present disclosure provides the following technical solutions.

Integrated automatic detecting equipment for a highway network structure group includes a tractor, a test vehicle A and a test vehicle B.

A central control system, a geometric linear detection system, a road three-dimensional (3D) detection system, and a laser 3D scanning system are arranged on the tractor.

A front end of the test vehicle A is detachably connected to a rear end of the tractor, and a rear end of the test vehicle A is detachably connected to a front end of the test vehicle B.

A drop hammer loading system is arranged on the test vehicle A.

A bridge dynamic detection system is arranged on the test vehicle B.

The geometric linear detection system, the road 3D detection system, and the drop hammer loading system are used for road detection.

The bridge dynamic detection system is used for bridge detection.

The laser 3D scanning system is used for tunnel detection.

The geometric linear detection system, the road 3D detection system, the laser 3D scanning system, the drop hammer loading system, and the bridge dynamic detection system are all electrically connected to the central control system.

Further, the test vehicle B may be a single degree of freedom vehicle.

Further, the laser 3D scanning system may be arranged on a top of the rear end of the tractor.

Further, the road 3D detection system may include a 3D camera sensor configured to acquire pavement 3D data, a distance control encoder configured to carry vehicle speed and output mileage information, and a data storage acquisition system configured to record depth information and brightness information.

Further, multiple 3D camera sensors may be arranged linearly and equidistantly.

Further, the geometric linear detection system may include a vehicle inertial unit configured to record vehicle trajectories, an accelerometer sensor configured to record vehicle vibration and turbulence, and portable body scanning equipment configured to detect a center of gravity and geometric parameters of logistic transportation vehicles.

A data management system of the integrated automatic detection equipment for a highway network structure group mentioned above includes databases and human-computer interaction.

The databases include a knowledge database and a dynamic database, the knowledge database includes diseases corresponding to detection data and key evaluation indexes, degree classification, and treatment and maintenance plans, and the dynamic database includes underlying data, structured data, and key index data.

The human-computer interaction includes a real-time traffic detection mode and a short-term safety detection mode.

Further, the underlying data may include image data and point cloud data; the structured data may include disease types and equivalent areas; the key index data may include overall deflection, international roughness indexes, and safety speed limits.

Further, the real-time traffic detection mode may include detection data management, traffic capacity evaluation, traffic plan decision, and quick maintenance methods.

Further, the short-term safety detection mode may include detection data management, traffic capacity evaluation, traffic plan decision, quick maintenance methods, and short-term safety evaluation.

Compared with the prior art, the present disclosure has the following beneficial effects:

(1) The gaps in the evaluation method of professional transportation capacity of road-bridge-tunnel facilities are filled.

The current evaluation method aims at the long-term safety, applicability and durability of the structure, which is different from special vehicle capacity evaluation. Therefore, it is necessary to develop a corresponding automatic acquisition system, establish a reliable data source, and build a detection index system and method that meets special vehicle capacity evaluation, thereby filling in the technical gap.

(2) Basic facility data and a management basis are provided for professional transportation system management.

Although the road network system needs to provide services for both ordinary transportation and professional transportation, in actual daily management practices, both the allocation of funds and the maintenance level are based on the needs of ordinary transportation, while the data support for professional transportation demand management is lacking. It is necessary to continuously improve the management of the professional transportation system based on the development of this system and the establishment of related evaluation models, and provide short-term emergency safety detection and evaluation services based on professional transportation under non-standard vehicle loads according to the professional traffic and transportation level of road-bridge-tunnel.

(3) Real-time early warning and rapid repair requirements during professional transportation are met.

In view of the suddenness and temporary nature of professional transportation, there may be many unpredictable situations along the route. Therefore, structural safety detection, passing ability and driving safety evaluation need to be completed quickly and in real time, so as to provide safety warning and quick repair plan for the motorcade.

(4) Demand for road-bridge-tunnel integrated rapid detection is met.

Unblocked transportation capacity in emergency relies on the joint smooth flow of roads, bridges, and tunnels. The interruption of any node in the transportation network may seriously affect the transportation capacity. Hence, the road-bridge-tunnel integrated detection system can perform full coverage detection on important infrastructure of transportation routes in a short period of time, and evaluate the professional transportation capacity of each section of the short professional transportation network.

(5) A road-bridge-tunnel integrated rapid detection data management system is established. Based on the development of the database and human-computer interaction acquisition system, a complete set of road-bridge-tunnel integrated rapid detection data management system is established, which facilitates users to scientifically manage and rationally use various detection data, and realizes the functions of data transmission, exchange and sharing, pre-processing analysis between the detection modules. The standardized data management and integration system is established to provide data support for the follow-up safety evaluation of road-bridge-tunnel.

(6) The road system completes road damage, deformation damage, and texture detection. In-depth detection accuracy can reach 0.1 mm, the sampling interval can reach 1 mm, and the measuring range is greater than 40 cm. The disease analysis, detection and identification of units no less than 1 cm*1 cm is realized, and more than 5 pavement types are detected. No less than 3 load combinations is realized in the structural bearing capacity discrimination. The discrimination accuracy rate of various indexes is more than 90%, the dynamic repetition accuracy is more than 95%, and the road network evaluation node is less than 1 meter.

(7) In terms of the bridge detection system, an overall bridge deformation detection platform is built, which can automatically identify and measure the relative deformation and deflection of different sections of the beam structure under any load. In the case of a span of 20-100 m, the overall accuracy reaches 0.5 mm.

(8) Research on the on-board system of tunnel digital 3D reconstruction and stability detection is carried out, realizing automatic measurement of tunnel 3D relative deformation. The point accuracy is 2.9 mm@20 m, the scanning speed is 30 s/20 m, and the scanning rate is not less than 2,000,000 point/s.

(9) The present disclosure realizes road-bridge-tunnel data integration, human-computer interaction design of the acquisition interface, real-time analysis of key indexes, and output of treatment plans, completes short-term (within 1 month) safety evaluation based on relevant indexes of roads, bridges and tunnels, provides reinforcement measures, and establishes a road-bridge-tunnel detection data accumulation mechanism in terms of long-term management.

DETAILED DESCRIPTION OF THE EMBODIMENTS

In order to enable those skilled in the art to better understand the present disclosure, the technical solutions of the present disclosure will be further explained below in conjunction with embodiments.

Figure 6:
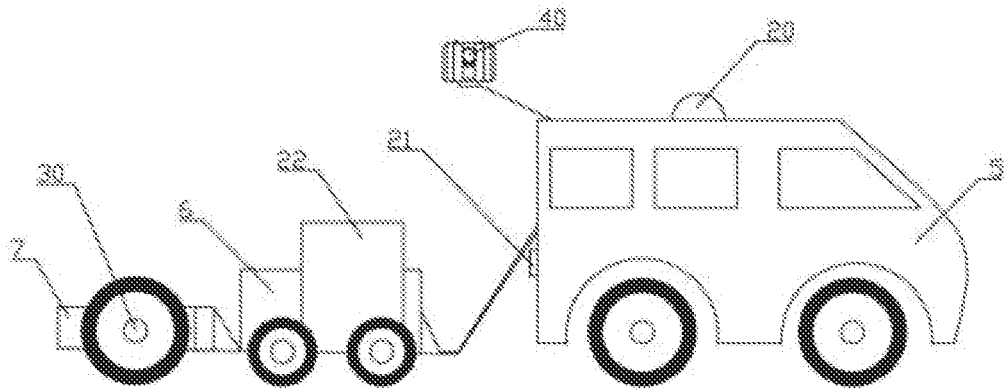
FIG. 6 is a schematic side-view structural diagram of an embodiment of the integrated automatic detection equipment for a highway network structure group of the present disclosure.
Figure 7:
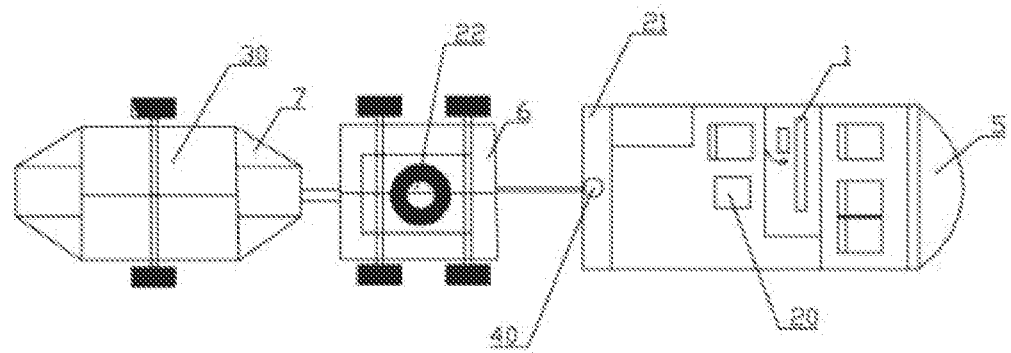
FIG. 7 is a schematic top-view structural diagram of an embodiment of the integrated automatic detection equipment for a highway network structure group of the present disclosure.
Figure 8:
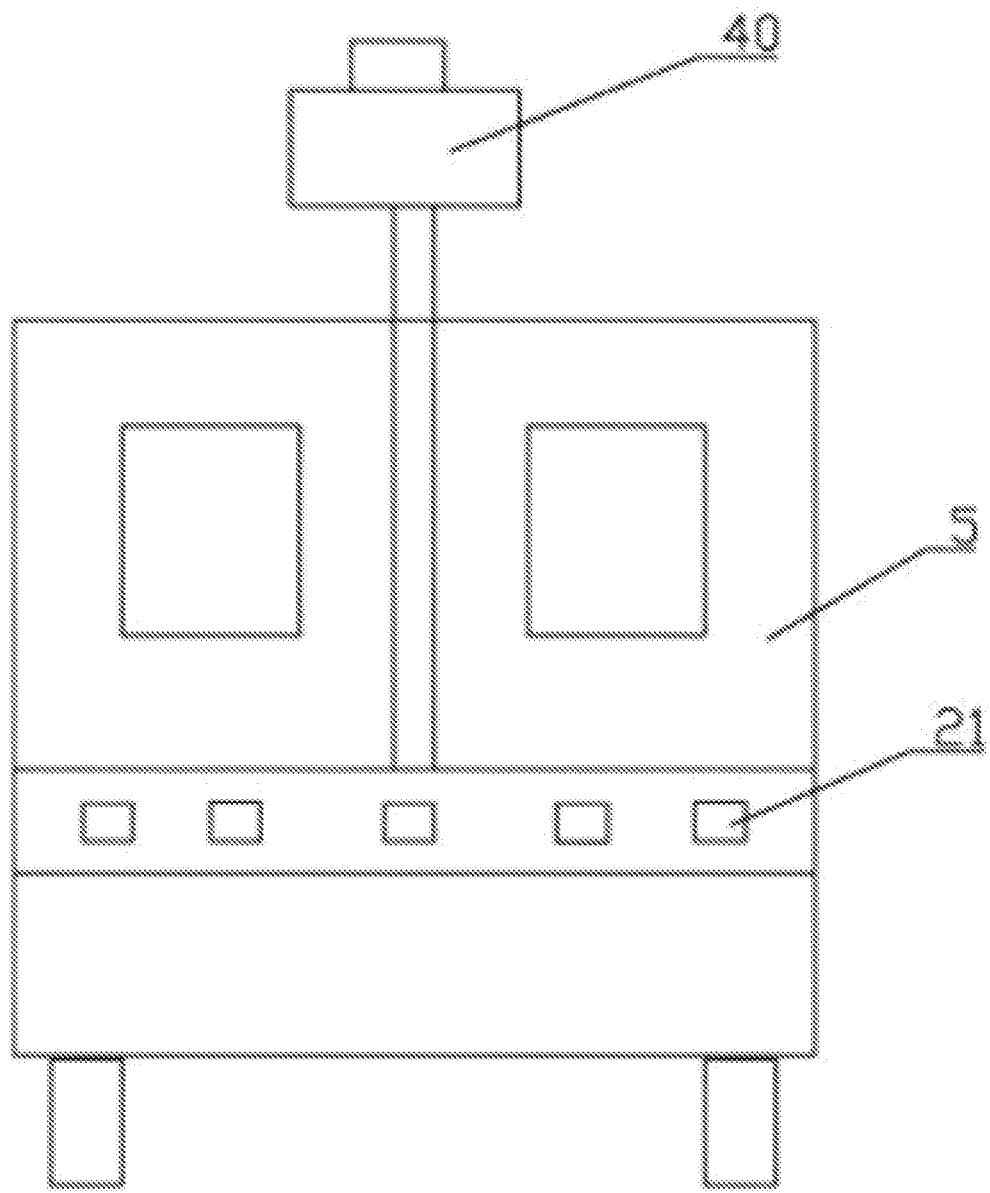
FIG. 8 is a schematic rear-view structural diagram of an embodiment of the integrated automatic detection equipment for a highway network structure group of the present disclosure.

As shown in FIG. 6 to FIG. 8, integrated automatic detection equipment for a highway network structure group of the present disclosure includes a tractor 5, a test vehicle A 6 and a test vehicle B 7.

A central control system 1, a geometric linear detection system 20, a road 3D detection system 21, and a laser 3D scanning system 40 are arranged on the tractor 5.

A front end of the test vehicle A 6 is detachably connected to a rear end of the tractor 5, and a rear end of the test vehicle A 6 is detachably connected to a front end of the test vehicle B 7.

A drop hammer loading system 22 is arranged on the test vehicle A 6.

A bridge dynamic detection system 30 is arranged on the test vehicle B 7.

The geometric linear detection system 20, the road 3D detection system 21, and the drop hammer loading system 22 are used for road detection.

The bridge dynamic detection system 30 is used for bridge detection.

The laser 3D scanning system 40 is used for tunnel detection.

The geometric linear detection system 20, the road 3D detection system 21, the laser 3D scanning system 40, the drop hammer loading system 22, and the bridge dynamic detection system 30 are all electrically connected to the central control system 1.

As a preferred solution, the test vehicle B 7 may be a single degree of freedom vehicle.

As a preferred solution, the laser 3D scanning system 40 may be arranged on a top of the rear end of the tractor 5.

As a preferred solution, the road 3D detection system 21 may include a 3D camera sensor configured to acquire pavement 3D data, a distance control encoder configured to carry vehicle speed and output mileage information, and a data storage acquisition system configured to record depth information and brightness information.

As a preferred solution, multiple 3D camera sensors may be arranged linearly and equidistantly.

As a preferred solution, the geometric linear detection system 20 may include a vehicle inertial unit configured to record driving trajectories, an accelerometer sensor configured to record vehicle vibration and turbulence, and portable body scanning equipment configured to detect a center of gravity and geometric parameters of logistic transportation vehicles.

A data management system of the integrated automatic detection equipment for a highway network structure group mentioned above includes databases and human-computer interaction.

The databases include a knowledge database and a dynamic database. The knowledge database includes diseases corresponding to detection data and key evaluation indexes, degree classification, and treatment and maintenance plans, and the dynamic database includes underlying data, structured data, and key index data.

The human-computer interaction includes a real-time traffic detection mode and a short-term safety detection mode.

As a preferred solution, the underlying data may include image data and point cloud data; the structured data may include disease types and equivalent areas; and the key index data may include overall deflection, international roughness indexes, and safety speed limits.

As a preferred solution, the real-time traffic detection mode may include detection data management, traffic capacity evaluation, traffic scheme decision, and quick maintenance methods.

As a preferred solution, the short-term safety detection mode may include detection data management, traffic capacity evaluation, traffic scheme decision, quick maintenance methods, and short-term safety evaluation.

Figure 1:
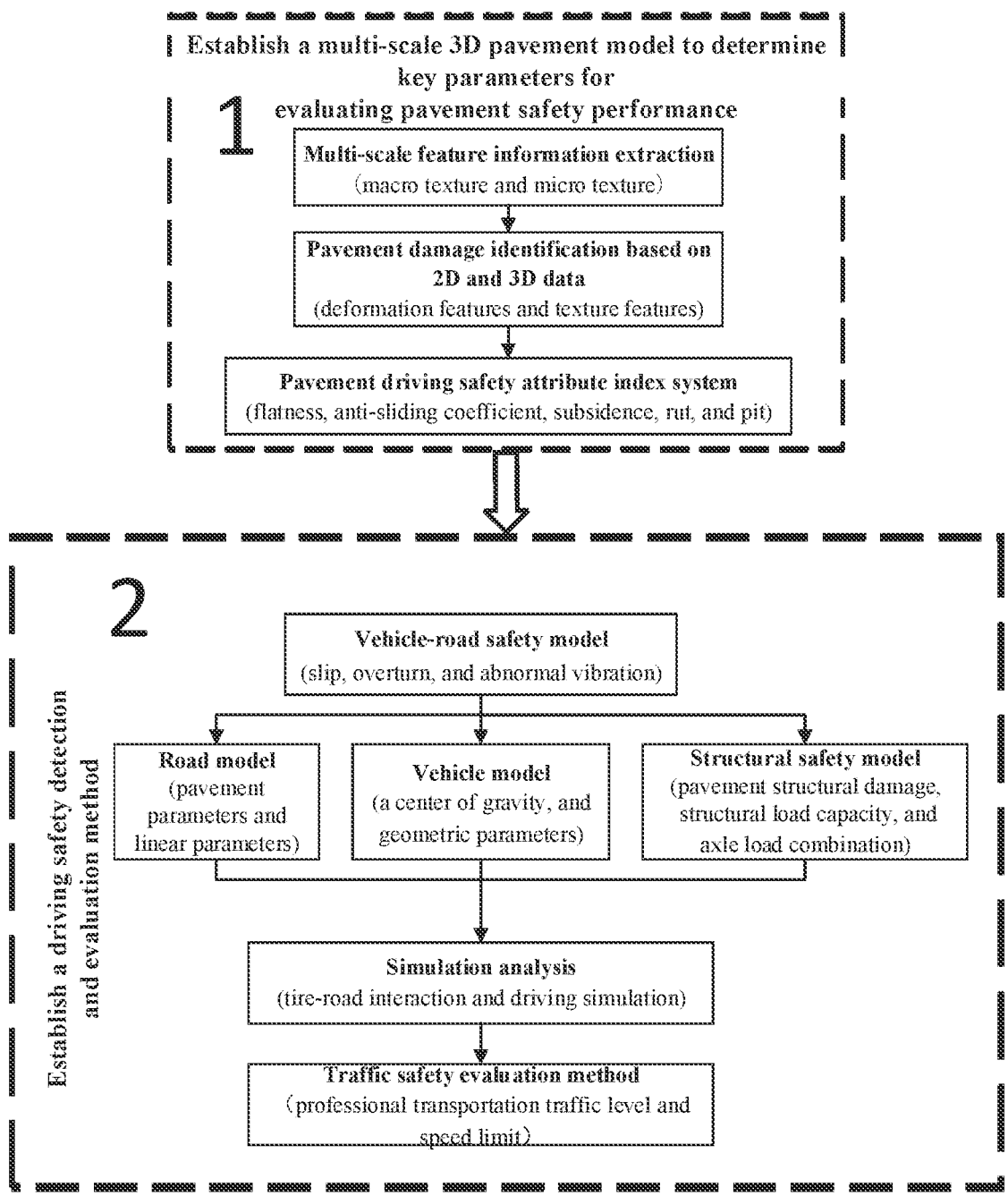
FIG. 1 is a technical path map of road capacity evaluation in an embodiment of integrated automatic detection equipment for a highway network structure group of the present disclosure (the first half)
Figure 2:
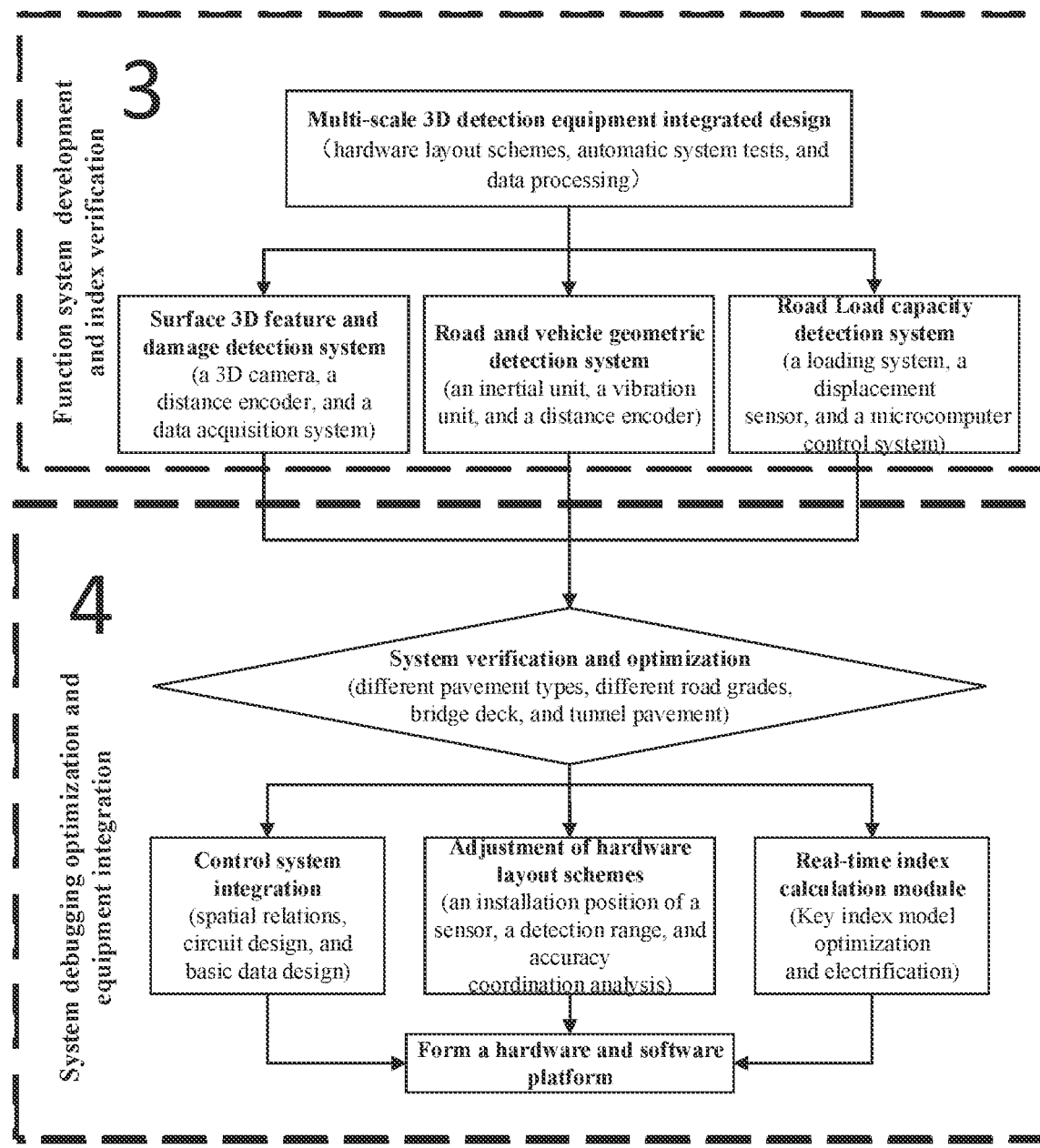
FIG. 2 is a technical path map of road capacity evaluation in an embodiment of the integrated automatic detection equipment for a highway network structure group of the present disclosure (the second half)

I. The technical path to be used in the research on road traffic capacity detection and evaluation technology is shown in FIG. 1 and FIG. 2.

The research content I includes two parts: related theoretical and experimental research and hardware development. Theoretical and experimental research includes the establishment of a 3D pavement model, the detection and evaluation method of driving safety; hardware development includes systematic development, testing index verification, system debugging optimization of the entire software and hardware platform and equipment integration. The specific implementation path is as follows.

(1) A multi-scale 3D pavement model is established to determine key parameters for evaluating pavement safety performance. A semi-automated 3D data acquisition system is used for indoor and outdoor experiments and data acquisition. By analyzing 3D data from different scales of the road (including texture, crack damage, deformed damage, flatness, etc.), the establishment of the data model of road surface detection is determined and macro texture, fine texture and micro texture are extracted. In terms of parameterization, through deep learning of texture features (3D data) and two-dimensional (2D) image data, the pavement type (asphalt, cement), the maximum particle size of mixtures (10/13/20/25), the pavement damage type (including transverse and longitudinal cracks, fractures, trenches, looseness, ruts, subsidence, wave envelope, bleeding and repair of asphalt pavement, including cracks, corner dropping, broken plates, hole shedding, joint fracture, arching, dislocation of cement pavement and so on) and the rut type are automatically identified, the severity of damage is quantified and determined, and the key damage affecting the structure is determined. In terms of flatness, the longitudinal flatness of different strips positions is determined by calculation and analysis of 3D deformation. In terms of the anti-sliding model, an anti-sliding coefficient model is established under the influence of texture, gradation combination and old and new pavement (overall wear degree and related damage).

(2) A driving safety detection and evaluation method is established. The interaction between the tire and pavement is analyzed by mechanical simulation software such as ANSYS, so as to verify the texture indexes for anti-sliding performance evaluation. The standard axial load type is determined, a theoretical model of vehicle-road dynamics safety analysis based on geometric parameters is established, and Carsim driving simulation software is used to establish a driving safety analysis model including linear parameters and key volume parameters of special vehicles and the relevant conclusions of theoretical analysis are compared and verified. Based on the professional transportation standard axial load and drop hammer curved detection technology, a load capacity evaluation model is established. Based on the driving safety model and structural load capacity, a speed limit model is researched and a special vehicle driving safety speed limit query table is designed, and the road professional transportation level is determined. The 3D scanning technology is used to quickly evaluate the amount of backfilling of large-scale damage such as the craters, deflection loading equipment is used to detect the residual load capacity of the structure after backfilling, and the traffic capacity of professional transport vehicles. In view of the usual times, combined with professional transportation demand, restrictions on vehicle passage in relevant roads are provided, and the regular detection standards are set. Daily detection and evaluation data is accumulated, and the knowledge database and facility model in the data management system are improved.

(3) Based on the theoretical model and the index system required for safety evaluation, the various functional modules of the detection system is developed, the relevant detection indexes are verified, and the related models are corrected. The design of detection ranges and accuracy, hardware selection, and an algorithm model of detection indexes are included. The 3D detection system includes a 3D camera sensor configured to acquire pavement 3D data, a distance control encoder configured to carry vehicle speed and output mileage information, and a data storage acquisition system configured to record depth information and brightness information. The road and vehicle geometric detection system mainly include a vehicle inertial unit configured to record vehicle trajectories, an accelerometer sensor configured to record vehicle vibration and turbulence and portable body scan equipment configured to detect a center of gravity and geometric parameters of logistic transportation vehicles. The structural detection module mainly includes a load loading system, a displacement sensor and a control system. Each subsystem utilizes a small automatic platform for testing, and verifies index models and calculation results of various indexes, including a rut index, a texture index, a flatness index, an anti-sliding index, a linear index, and a structural load capacity index. An automatic detection and index calculation module is developed.

(4) System debugging optimization and software and hardware platform integration are carried out. By actual road testing, the software system of each module is continuously optimized, the overall data design is performed, and the control systems of different acquisition modules are integrated. Since the in-vehicle platform itself affects the hardware layout of the actual assembly, it is necessary to adjust the hardware layout schemes to some extent. After adjustment, it is necessary to correct the relevant parameters of the existing underlying data processing algorithm through testing to determine the final detection range, and verify dynamic accuracy with the multi-freedom vibration platform. Since key safety indexes (structural rutting, sinks, etc.) require real-time output, the algorithm of image processing is often time consuming (such as: 8-hour 3D image acquisition data requires approximately about 4 h processing time with i73.0 GHz, Windows7 professional operating system), and algorithm optimization or algorithm electrification (such as: no output and storage of image data) need to be used to complete the real-time output module of the key safety index.

Figure 3:
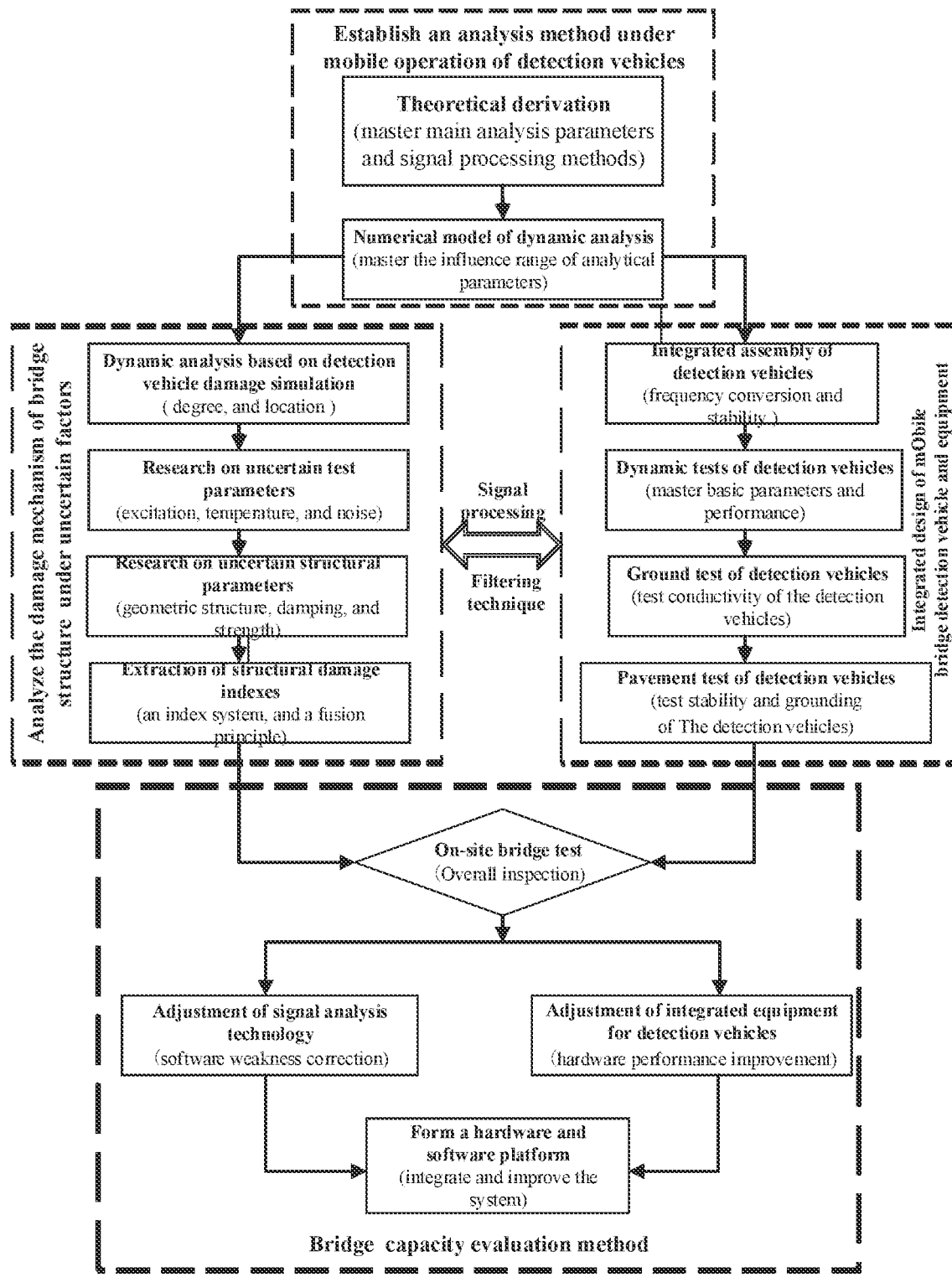
FIG. 3 is a technical path map of bridge capacity evaluation in an embodiment of the integrated automatic detection equipment for a highway network structure group of the present disclosure.

II. The technical path to be used in the research on bridge capacity detection and evaluation technology is shown in FIG. 3.

The research content II takes the technical path of theoretical analysis, numerical simulation, model test and on-site measurement. The overall technical route is as follows.

(1) A vehicle-bridge coupling dynamic analysis method under the mobile operation of automatic bridge detection vehicles is established. Through the vehicle-bridge coupling mechanical model and theoretical evolution analysis, the main control parameters are mastered, the actual vehicle-bridge damping, pavement roughness, temperature difference, and cross-section change are considered, and the feasibility signal processing method of the bridge power parameters are derived. Through numerical analysis and simulation of the whole vehicle-bridge dynamic test system, the vehicle-bridge coupling model of Abaqus software and the vehicle-bridge coupling model of MATLAB are established for bidirectional verification. Then, the actual vehicle-bridge coupling model is improved to meet the engineering accuracy requirements. Typical medium and small span bridges on Chongqing highways are further selected for modeling analysis to study the relationship between non-contact components (parts that cannot be contacted by tires of automatic bridge detection vehicles), contact components, nodes and test signals of the automatic bridge detection vehicles. Parameter correction of the finite element model is realized by calling MATLAB platform with secondary development of Abaqus software. The influence of design optimization parameters of automatic bridge detection vehicles is found out by dynamic analysis methods, so that a more reliable reference for actual operations is provided.

(2) The damage mechanism of medium and small span bridge structure under uncertain factors is analyzed. Concrete medium and small span bridges under conventional strength is studied, and the dynamic test effects of T-beam, box girders, hollow plates and variable cross-sections under different supports are analyzed. Based on the dynamic test damage simulation of beam components under different roughness levels and different temperature changes and with the foundation of probability density evolution and Bayesian theory, quantitative relationships between uncertain parameters such as bridge damping, excitation amplitude, spectrum, and time and damage of beam component are established, the damage mechanism is analyzed, the damage mechanism of the bridge structure dynamic test under uncertain parameters is clarified, the extraction principle of damage indexes based on automatic bridge detection vehicles is established, parallel and weight evidence fusion for related information and damage index are carried out, and different damage index sensitivity and noise sensitivity under two (or more) uncertain parameters are analyzed.

(3) Integrated design of automation mobile bridge detection vehicle and equipment is carried out. By comparing with the dynamic analysis model, the dynamic test, ground and road test under the mobile operation of the automatic bridge detection vehicle are carried out step by step. The integrated design and assembly of the automatic bridge detection vehicle are completed. The dynamic test, ground and pavement test, and on-site test are carried out.

(4) The bridge capacity evaluation method is as follows. Based on theoretical analysis, the dual-vehicle technology is considered to filter the pavement roughness signal. The signal analysis methods such as support vector machine, short-time Fourier transform, singular spectrum analysis, Hilbert-Huang transform and blind source separation are selected to separate the vehicle frequency signal, temperature effect signal and other interference signals, signals only related to the bridge damage dynamic characteristics are extracted, the corresponding damage characteristic indexes are analyzed, and the damage degree of main components are evaluated. At the same time, combined with the existing standards for the classification of bridge safety grades, the ultimate bearing capacity corresponding to the structural reliability index based on the deformation deflection test is proposed, and influence of various uncertainties on the reliability of main components is determined. Through the comparison of on-site bridge tests, model analysis and conventional load tests, the blind spot of signal analysis technology is constantly corrected, and the integrated equipment of automatic bridge detection vehicle is improved, which provides a continuously improved and usable software and hardware automation platform system equipment for automatic detection and diagnostic analysis of dynamic test signals of vehicle-bridge coupling bridge structures based on the mobile technology of automatic bridge detection vehicles. With analysis of the long-term and short-term change trends of safety evaluation indexes such as bridge strength and stiffness, combined with the road driving safety model with vehicle-road parameterized coordination, based on the real-time and short-term requirements of professional transport traffic, the threshold ranges of bridge load and speed limit under safety indexes such as strength and deflection are proposed respectively, and reliable evaluation of the professional transport traffic safety is taken purposefully. The structural safety and residual load capacity after bridge damage or damage reinforcement are detected and evaluated in real time, the overall safety impact relationship of bridges caused by damage conditions such as craters is timely discriminated, the level of professional transport capacity is evaluated, whether professional traffic special vehicles can cross the bridge safely is determined, and maintenance requirements of minimum repair risks are provided. In view of the usual times, rapid safety detection and evaluation of the bridge are regularly carried out according to professional transportation requirements, and corresponding data management systems are regularly maintained based on regular rapid detection data and evaluation levels, which provides data support for emergency evaluation and further improves the periodic detection index, frequency and detection method of bridge safety evaluation, so as to form the periodic detection standard.

Figure 4:
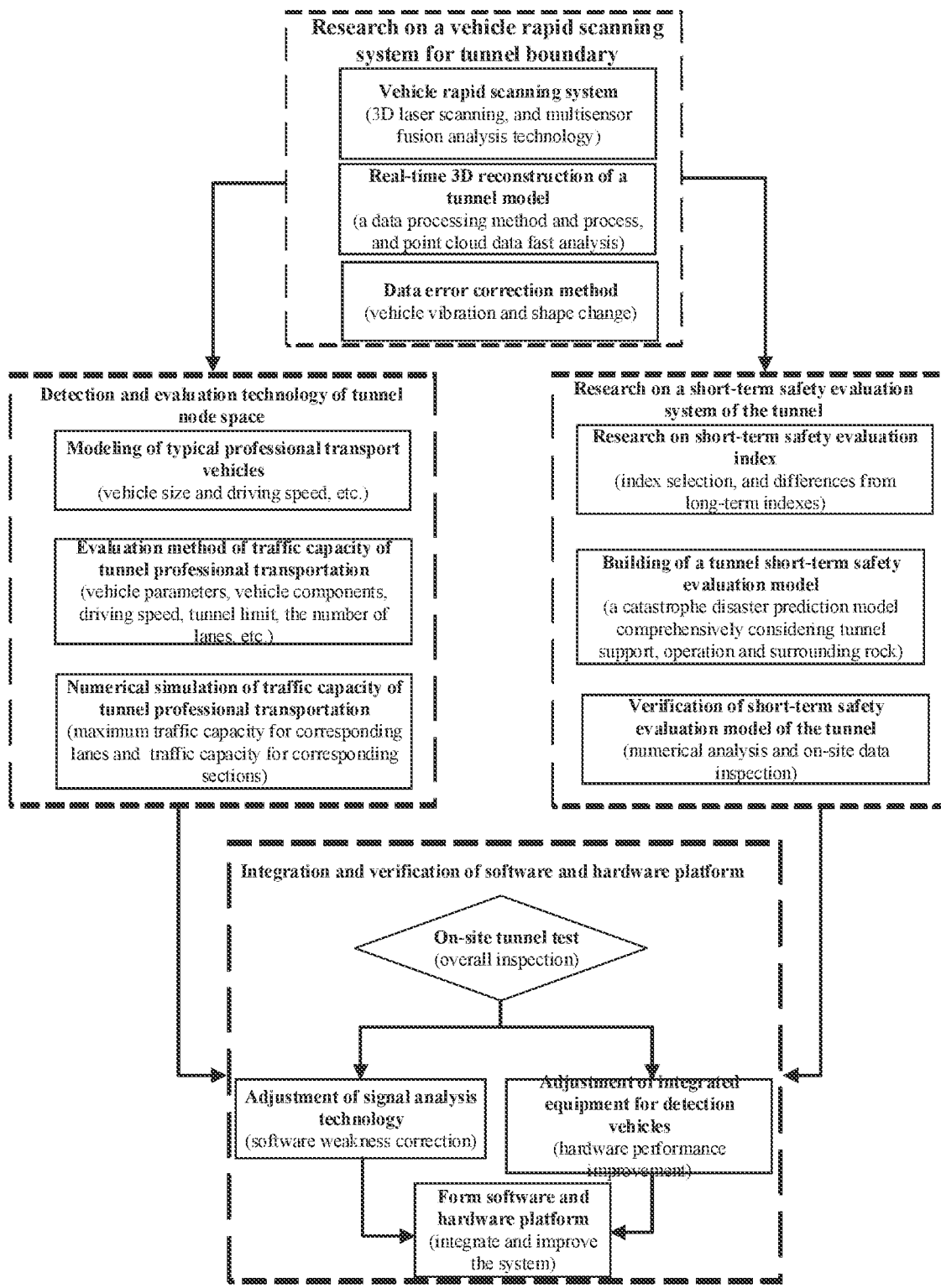
FIG. 4 is a technical path map of tunnel professional transportation capacity and tunnel short-term safety evaluation in an embodiment of the integrated automatic detection equipment for a highway network structure group of the present disclosure.

III. The technical path to be used in the research on tunnel traffic capacity detection and evaluation technology is shown in FIG. 4.

The research content III is to take the technical path of theoretical analysis, numerical simulation, model test and on-site measurement. The research scheme is as follows.

(1) Research on a vehicle rapid scanning system for tunnel boundary is carried out. Indoor tests and on-site tests are carried out by using the panoramic cloud platform equipped with 3D laser sensors and test model vehicles, so as to determine the instrument placement parameters and detection process of 3D laser scanning technology and multi-sensor data fusion analysis technology for the tunnel boundary detection. The advantages and disadvantages of 3D laser sensors placed on the top of the tractor and on the towed detection platform are determined by experiments. Based on the improved differential method, the program modules of tunnel point cloud boundary extraction, tunnel boundary limitation and central axis establishment are developed. The minimization scheme of point cloud stitching error is studied based on the two-end stitching algorithm and the global stitching algorithm. According to the least squares principle, a cross-section curve fitting program module is developed for common tunnel cross-section shapes such as straight wall arch cross-section, multi-lane cross-section of three-center circular tank arch with inverted arch, rectangular cross-section and circular cross-section.

Point cloud denoising algorithms and programs for "hybrid point" type noise points of tunnel auxiliary facilities such as lighting equipment, ventilation pipes, bolts and power facilities are developed by the mean error method. Through the structural dynamics theory, the vibration data of the acceleration sensor of the measurement system is used to derive the influence of the vibration generated by the vehicle in the tunnel on the measurement data and develop the vibration error correction program module. Based on the geometric relationship, the data of the tilt sensor of the measurement system is used to derive the calculation formula of the influence of the tunnel section change and the tunnel bend on the measurement results, and compile the corresponding error correction program. Based on the representative point method and regular grid method, aiming at the problem of rapid evaluation of tunnel professional transport capacity, the simplification method of massive point cloud data is studied.

(2) Research on the detection and evaluation technology of tunnel node space is carried out. The tunnel spatial changes, large diseases, deformation and settlement are scanned. Combined with the rapid detection device of vehicle geometric characteristics, instant traffic capacity is determined. In view of the usual times, the mathematical modeling of typical professional transport vehicles is completed based on the data investigation of spatial geometric dimensions (such as the maximum outsourcing size and wheelbase) and driving speed of the typical professional transport vehicles. Based on theoretical derivation, the traffic flow parameter model, which considers the parameters such as vehicle parameters, vehicle components, driving speed, tunnel limit, and the number of lanes, is determined, and the evaluation formula of the professional transport capacity of the tunnel is derived. By using the vehicle simulation software CarSim, the traffic simulation of the traffic capacity of the professional transport tunnel under different numbers of lanes, different tunnel cross-section shapes and cross-section sizes is carried out, and the calculation formulas of the traffic capacity of the corresponding lanes and corresponding sections are determined, and the optimized traffic scheme of the professional transport tunnel is designed.

(3) Research on a short-term safety evaluation system of the tunnel is carried out. Based on the induction and summary of the research status in the field of short-term safety of tunnels, the characteristics of common short-term safety analysis methods of tunnels are determined, and the indexes suitable for short-term safety evaluation of tunnels (such as the curvature mutation of a tunnel section shape curve and the size of a broken area of a tunnel inner wall) are screened out. The FLAC software numerical simulation is used to determine the similarities and differences between short-term safety evaluation indexes and common long-term safety indexes (such as strain rate and total deformation). Based on catastrophe theory of tunnel disasters, the expressions of potential function, equilibrium surface and bifurcation point set of catastrophe model of tunnel under general constitutive relation are derived, the acquisition methods of control variables, stiffness ratio and instability criterion are given, and the relationship between the index jump value of safety evaluation and the instability criterion of the model are determined when the tunnel is instable. Based on theoretical analysis, the safety evaluation index obtained through FLAC numerical simulation is used as the basis of the tunnel safety criterion data to determine the index change characteristics of the characteristic points of the tunnel and the development law of the plastic zone. Based on the linear regression method, according to the tunnel short-term safety evaluation index value obtained by simulation, combined with different catastrophe model criteria and based on the obtained system potential function, the alarm threshold of tunnel short-term safety evaluation index is established. Through theoretical analysis and numerical calculation, the cause of error between the theoretical value and simulation value of control variables in tunnel system is proved during catastrophe analysis. Based on the above research, the tunnel short-term safety evaluation system comprehensively considering the factors of tunnel size and category, service life, surrounding rock condition, and damage degree is developed. Laser 3D scanning equipment is used to scan the large-scale diseases, deformation and settlement of the tunnel, the real-time structural safety is evaluated, and the rapid maintenance and reinforcement scheme with the lowest risk is provided. In view of the usual times, the frequency and content of the safety periodic detection of the tunnel structure are determined according to the professional transportation demand, and the periodic detection standards are formulated, the structural safety performance is evaluated and predicted.

(4) Software and hardware platform integration and verification are carried out. Based on the research results of the above 3D laser scanning and point cloud data processing algorithms and the methods of indoor and on-site tests, the optimization scheme of the cooperative work and data transmission between the laser scanning system, the multi-sensor fusion system, the acceleration sensor for vibration acquisition, the inclination detection sensor of the scanning platform, the central processor of data processing and the data memory is determined. By adjusting the working parameters of each component of the hardware system, the optimization of the integrated equipment for the rapid evaluation of the traffic capacity of the tunnel professional transportation by the detection vehicle is determined, so as to integrate and improve the system and form the final software and hardware platform.

Figure 5:
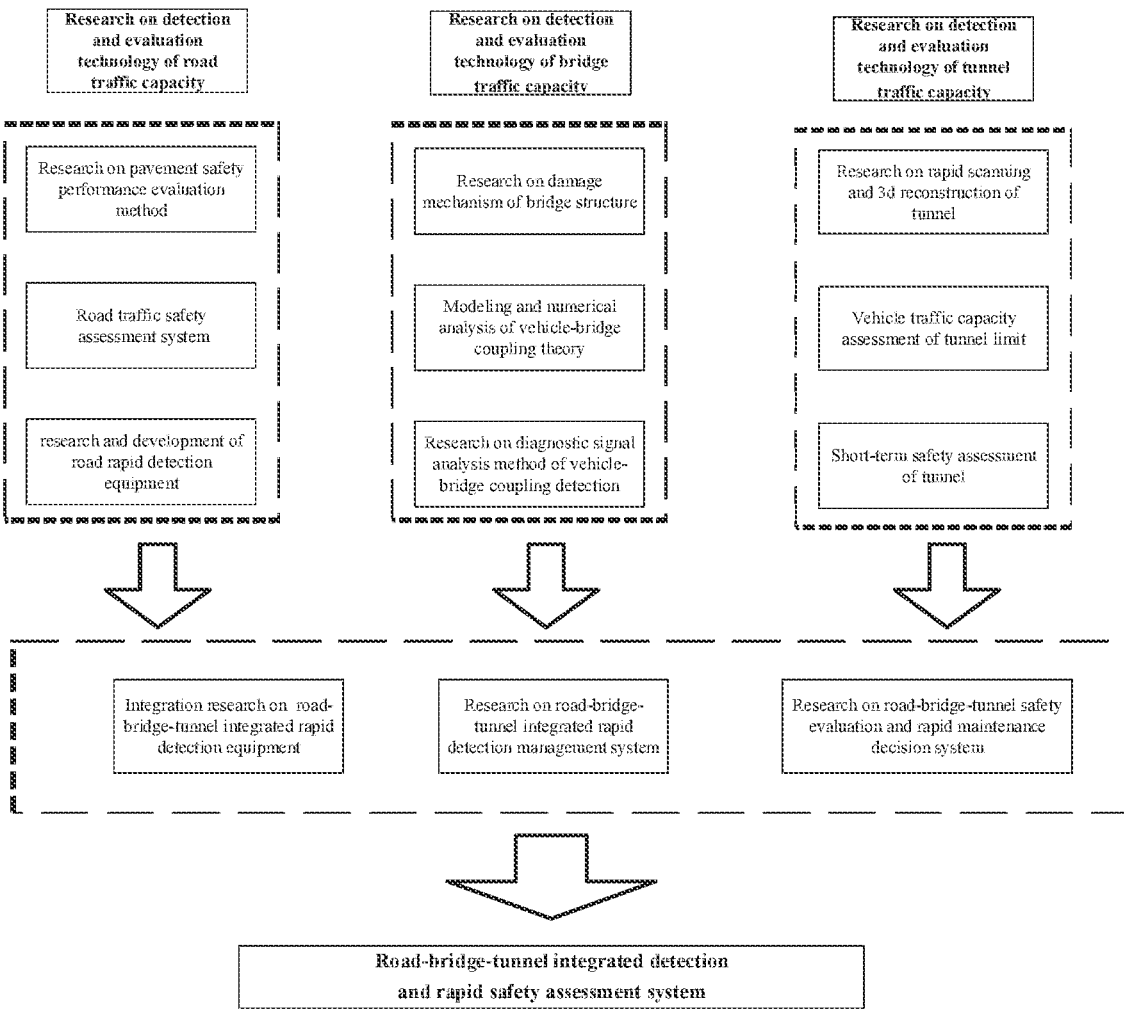
FIG. 5 is a research path map of road-bridge-tunnel integrated detection and rapid safety evaluation system in an embodiment of the integrated automatic detection equipment for a highway network structure group of the present disclosure.

IV. The technical path to be used in the research on road-bridge-tunnel integrated detection and rapid safety evaluation system is shown in FIG. 5.

An objective of the research content IV is to complete equipment integration, and optimize and establish the integrated detection and rapid evaluation system based on the road-bridge-tunnel research and detection system development. In fact, the implementation path includes three main parts of equipment integration, data management acquisition system development, and safety evaluation and decision-making system development.

Considering the actual engineering characteristics of road-bridge-tunnel detection, combined with the technical indexes such as detection accuracy, work efficiency and sampling frequency determined in the aforementioned research, hardware devices that can simultaneously meet the detection requirements of this project is developed. Combined with the actual size and carrying capacity of the vehicle carrier, the equipment is integrated and installed on the same vehicle carrier, and the versatility and interactivity of each equipment are taken into account. The hardware design scheme of vehicle integrated equipment for road-bridge-tunnel rapid detection is determined, so that it can meet the needs of road-bridge-tunnel rapid detection for special vehicles with different wheelbases and sizes. On this basis, the automatic control scheme, dynamic calibration scheme, front-end data storage and pre-processing requirements of each detection equipment are determined, the central control system of road-bridge-tunnel integrated rapid detection equipment is developed, the data acquisition mode and cooperative work mode of various types of detection equipment are controlled in real time, the repeated utilization rate of devices under different detection targets is improved, and the integration and automation control of the road-bridge-tunnel integrated rapid detection equipment are completed.

As shown in FIG. 6 to FIG. 8, the tunnel scan is set to the same cross section as the road sweep surface section, and the detection range has a certain degree of overlapping for data fusion calibration. The road load loading system may assist the dynamic deflection measurement of the bridge in addition to curved measurement. The roughness index obtained from road texture/flatness detection may be used for signal noise reduction during bridge detection.

Figure 9:
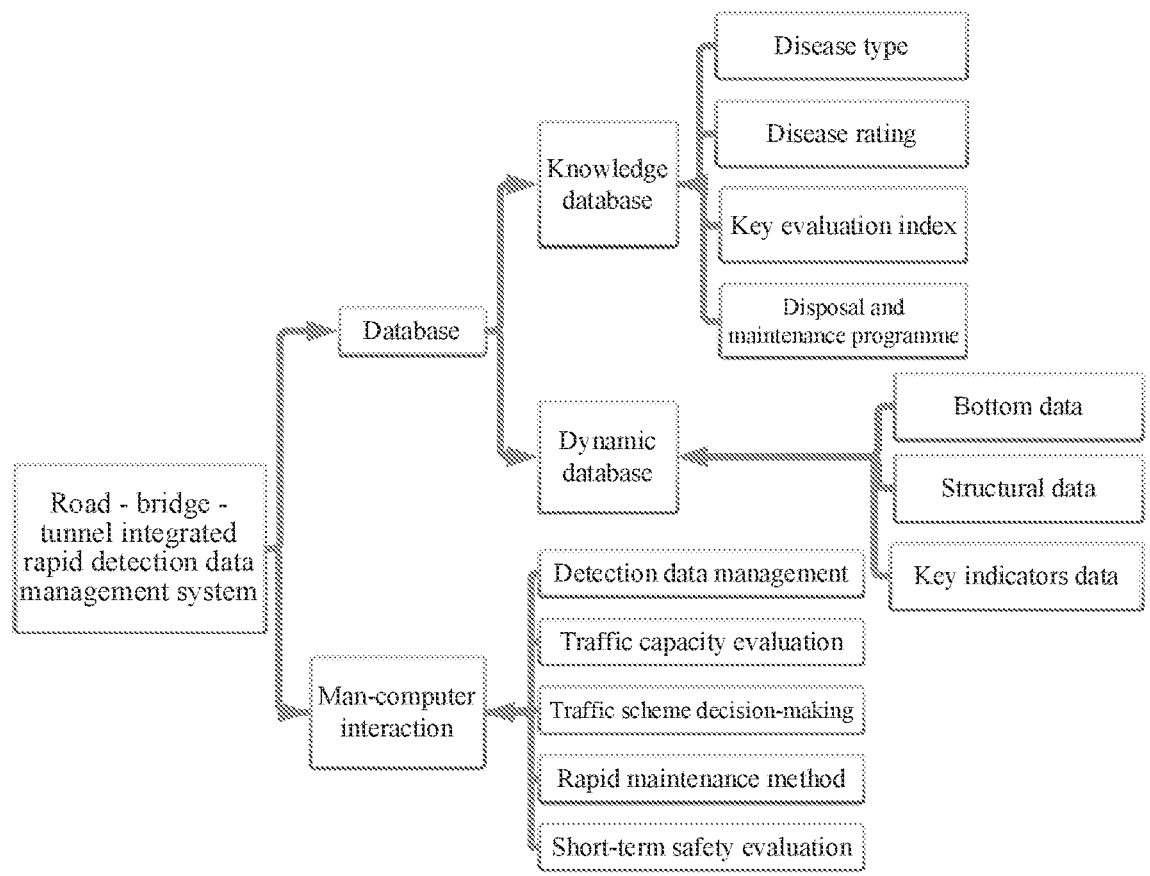
FIG. 9 is a diagram of a data management system of an embodiment of the integrated automatic detection equipment for a highway network structure group of the present disclosure.

As shown in FIG. 9, the database set of the road-bridge-tunnel integrated detection data management system is developed by the database development software mySQL. Based on the research of existing road-bridge-tunnel detection index systems, a road-bridge-tunnel test knowledge database, including the diseases corresponding to detection data and key evaluation indexes, degree classification, and treatment and maintenance plans, is established. A dynamic database based on rapid detection is established, and the storage method of the road-bridge-tunnel detection data is designed based on the unified spatio-temporal index, including 3 levels of the underlying data of storage scheme (image data, point cloud data, etc.), quantitative data (disease types, equivalent areas, etc.), and key index data (overall deflection, international roughness indexes, safety speed limits, etc.), and the integrity, safety and independence of data are also taken into account. The full sharing and cross-access of data of each detection module is realized. Meanwhile, the database real-time update and the accumulation of historical data are kept, and a historical database is built.

According to the interface development principle of human-computer interaction, human-computer interaction development software Delphi is used, and combined with database sets, a human-computer interaction interface platform for the road-bridge-tunnel integrated rapid detection system is developed, including two different working modes of real-time traffic detection mode and short-term safety detection mode. The real-time traffic detection model mainly serves professional transport pilot vehicles, including 4 functions of detection data management, traffic capacity evaluation, traffic scheme decision and quick maintenance methods. The short-term safety detection mode is mainly for professional transportation periodic detection requirements, and should include short-term safety evaluation except for the above functions.

Data composition and function design are shown in FIG. 9.

Based on the development of the database and human-computer interaction acquisition system, a complete set of road-bridge-tunnel integrated rapid detection data management systems is established, which facilitates users to scientifically manage and rationally use various detection data, and realizes the functions of data transmission, exchange and sharing, pre-processing analysis between the detection modules. The standardized data management and integration system is established to provide data support for the follow-up safety evaluation of road-bridge-tunnel.

The road-bridge-tunnel integrated safety evaluation and rapid maintenance decision system is developed.

Based on integrated detection hardware equipment and data management system, the road-bridge-tunnel integrated safety evaluation decision system is further developed. A reasonable trigger mechanism is used to call the detection data in the data management system in real time. Through comparative analysis with the basic database of various types of diseases of roads, bridges and tunnels, the type of these diseases are classified, and the thresholds of all levels of the disease indexes affecting normal traffic capacity are determined. A rapid maintenance decision system with real-time traffic evaluation and short-term safety evaluation is established.

The maintenance decision system is established for the road-bridge-tunnel damage: through the enrichment of rapid repair material types and related repair technical measures, a collection of treatment scheme is established, ensuring that 1 to 3 recommended measures can be provided for different issues. For real-time traffic detection requirements, the decision tree method is used to quickly judge whether the special vehicle can pass. For situations that the vehicle can pass but requires real-time processing, a treatment classification system is established, including 3 levels of limit on speed and load of traffic, space occupancy temporary disposal, and rapid maintenance/emergency reinforcement. For situations that the vehicle cannot pass in the short term, through short-term safety evaluation, the key information of short-term maintenance and reinforcement scheme, engineering quantity, and engineering time are given.

It should be noted that the terms defined in the present disclosure are as follows.

Highway network structure group refers to the road, bridge, and tunnel.

Section limit traffic space refers to the instantaneous maximum traffic space provided by the actual operating road section for vehicles.

Road section traffic space refers to the maximum traffic space provided by the actual operating road for vehicles (i.e. the collection of limit traffic space for each section).

Node traffic space refers to the space that the bridge and tunnels can provide for transport vehicles, especially non-standard vehicles, to protect the transport vehicles from collision and scraping with the peripheral walls and accessory facilities, etc.

Vehicle-road safety model refers to a driving safety analysis model considering the parameters of the transport vehicle as a whole (including cargo), road alignment, road conditions, etc.

Road-bridge-tunnel professional transportation level refers to a level based on the road classification of professional transportation demand, and can be used to assist the professional transportation management department in determining the detection frequency and maintenance management level of the road.

Limit safety speed refers to a safety speed which is determined based on the kinetic effect of the bridge structure and road roughness combined with the actual situation of transport vehicles.

Load capacity refers to the maximum vehicle weight under different wheelbases allowed by roads and bridges under the single or cumulative effect.

Professional transportation capacity refers to the space passing capacity and load capacity (including cumulative effect) of special vehicle transportation that can be met by road-bridge-tunnel facilities.

Short-term safety evaluation refers to evaluation of the load capacity and corresponding traffic safety (whether there will be excessive deformation, subsidence, falling off, instability, etc.) of the road-bridge-tunnel in short term (within 1 month) for professional transportation demand.

Real-time traffic capacity evaluation refers to the real-time judgment of the professional transportation capacity and emergency passing measures by the road-bridge-tunnel safety early warning system as a pilot vehicle.

Finally, it should be noted that the above embodiments are only used to illustrate the technical solutions of the present disclosure and not to limit it. Although the present disclosure has been described in detail with reference to the preferred embodiments, those of ordinary skill in the art should understand that modification or equivalent replacement can be made to the technical solutions of the present disclosure without departing from the aim and scope of the technical solutions of the present disclosure, and those should be covered by the scope of the claims of the present disclosure.

What is claimed is:

1. An integrated automatic detection equipment for a highway network structure group, comprising
a tractor, a first test vehicle and a second test vehicle,
wherein a central control system, a geometric linear detection system, a road three-dimensional (3D) detection system, and a laser 3D scanning system are arranged on the tractor;
wherein the geometric linear detection system comprises a vehicle inertial unit configured to record driving trajectories, an accelerometer sensor configured to record vehicle vibration and turbulence, and a portable body scanning equipment configured to detect a center of gravity and geometric parameters of logistic transportation vehicles;
a front end of the first test vehicle is detachably connected to a rear end of the tractor, and a rear end of the first test vehicle is detachably connected to a front end of the second test vehicle;
a drop hammer loading system is arranged on the first test vehicle;
a bridge dynamic detection system is arranged on the second test vehicle;
the geometric linear detection system, the road 3D detection system, and the drop hammer loading system are used for a road detection, and are specifically used for indoor and outdoor experiments and data acquisition by using a semi-automated 3D data acquisition system, the determination of the establishment of the data model of road surface detection and the extraction of macro texture, fine texture and micro texture by analyzing 3D data from different scales of the road; in terms of parameterization, the automatic identification of the pavement type, the maximum particle size of mixtures, the pavement damage type and the rut type through deep learning of texture features and two-dimensional (2D) image data, the quantization and determination of the severity of damage, and the determination of the key damage affecting the structure; in terms of flatness, the determination of the longitudinal flatness of different strips positions by calculation and analysis of 3D deformation; in terms of the anti-sliding model, the establishment of an anti-sliding coefficient model under the influence of texture, gradation combination and old and new pavement; the analysis of the interaction between the tire and pavement by mechanical simulation software such as ANSYS, so as to verify the texture indexes for anti-sliding performance evaluation; the determination of the standard axial load type, the establishment of a theoretical model of vehicle-road dynamics safety analysis based on geometric parameters, and the establishment of a driving safety analysis model, including linear parameters and key volume parameters of special vehicles, by using Carsim driving simulation software, and the comparison and verification of the relevant conclusions of theoretical analysis; based on the professional transportation standard axial load and drop hammer curved detection technology, the establishment of a load capacity evaluation model; based on the driving safety model and structural load capacity, the research of a speed limit model and the design of a special vehicle driving safety speed limit query table, and the determination of the road professional transportation level; the quick evaluation of the amount of backfilling of large-scale damage such as the craters by using the 3D scanning technology, the detection of the residual load capacity of the structure after backfilling, and the traffic capacity of professional transport vehicles by using deflection loading equipment; in view of the usual times, combined with professional transportation demand, the provision of restrictions on vehicle passage in relevant roads, and the setting of the regular detection standards; the accumulation of daily detection and evaluation data, and the improvement of the knowledge database and facility model in the data management system;
the bridge dynamic detection system is used for a bridge detection, and is specifically used for the mastery of the main control parameters through the vehicle-bridge coupling mechanical model and theoretical evolution analysis, the consideration of the actual vehicle-bridge damping, pavement roughness, temperature difference, and cross-section change, and the derivation of the feasibility signal processing method of the bridge power parameters; through numerical analysis and simulation of the whole vehicle-bridge dynamic test system, the establishment of the vehicle-bridge coupling model of Abaqus software and the vehicle-bridge coupling model of MATLAB for bidirectional verification; then, the improvement of the actual vehicle-bridge coupling model being made for meeting the engineering accuracy requirements; the further selection of medium and small span bridges for modeling analysis being made for studying the relationship between non-contact components, contact components, nodes and test signals of the automatic bridge detection vehicles; the realization of parameter correction of the finite element model by calling MATLAB platform with secondary development of Abaqus software; finding out the influence of design optimization parameters of automatic bridge detection vehicles by dynamic analysis methods, so that a more reliable reference for actual operations is provided; studying concrete medium and small span bridges under conventional strength, and the analysis of the dynamic test effects of T-beam, box girders, hollow plates and variable cross-sections under different supports; based on the dynamic test damage simulation of beam components under different roughness levels and different temperature changes and with the foundation of probability density evolution and Bayesian theory, the establishment of quantitative relationships between uncertain parameters such as bridge damping, excitation amplitude, spectrum, and time and damage of beam component, the analysis of the damage mechanism, the clarification of the damage mechanism of the bridge structure dynamic test under uncertain parameters, the establishment of the extraction principle of damage indexes based on automatic bridge detection vehicles, the execution of parallel and weight evidence fusion for related information and damage index, and the analysis of different damage index sensitivity and noise sensitivity under uncertain parameter;

the laser 3D scanning system is used for a tunnel detection, and is specifically used for the execution of indoor tests and on-site tests by using the panoramic cloud platform equipped with 3D laser sensors and test model vehicles, so as to determine the instrument placement parameters and detection process of 3D laser scanning technology and multi-sensor data fusion analysis technology for the tunnel boundary detection; based on the improved differential method, the development of the program modules of tunnel point cloud boundary extraction, tunnel boundary limitation and central axis establishment; the studying of the minimization scheme of point cloud stitching error based on the two-end stitching algorithm and the global stitching algorithm; according to the least squares principle, the development of a cross-section curve fitting program module for common tunnel cross-section shapes such as straight wall arch cross-section, multi-lane cross-section of three-center circular tank arch with inverted arch, rectangular cross-section and circular cross-section; the development of point cloud denoising algorithms and programs for "hybrid point" type noise points of tunnel auxiliary facilities such as lighting equipment, ventilation pipes, bolts and power facilities by the mean error method; through the structural dynamics theory, the derivation of the influence of the vibration generated by the vehicle in the tunnel on the measurement data and the development of the vibration error correction program module by using the vibration data of the acceleration sensor of the measurement system; based on the geometric relationship, the derivation of the calculation formula of the influence of the tunnel section change and the tunnel bend on the measurement results by using the data of the tilt sensor of the measurement system, and the compilation of the corresponding error correction program; based on the representative point method and regular grid method, aiming at the problem of rapid evaluation of tunnel professional transport capacity, the studying of the simplification method of massive point cloud data; the scanning of The tunnel spatial changes, large diseases, deformation and settlement; combined with the rapid detection device of vehicle geometric characteristics, the determination of instant traffic capacity; in view of the usual times, completing the mathematical modeling of typical professional transport vehicles based on the data investigation of spatial geometric dimensions and driving speed of the typical professional transport vehicles; based on theoretical derivation, the determination of the traffic flow parameter model, which considers the parameters such as vehicle parameters, vehicle components, driving speed, tunnel limit, and the number of lanes, and the derivation of the evaluation formula of the professional transport capacity of the tunnel; the execution of the traffic simulation of the traffic capacity of the professional transport tunnel under different numbers of lanes, different tunnel cross-section shapes and cross-section sizes by using the vehicle simulation software CarSim, and the determination of the calculation formulas of the traffic capacity of the corresponding lanes and corresponding sections, and the design of the optimized traffic scheme of the professional transport tunnel; and the geometric linear detection system, the road 3D detection system, the laser 3D scanning system, the drop hammer loading system, and the bridge dynamic detection system are electrically connected to the central control system;

wherein the central control system is equipped with a human-computer interaction interface platform including two different working modes of real-time traffic detection mode and short-term safety detection mode, the real-time traffic detection model mainly serving professional transport pilot vehicles, including 4 functions of detection data management, traffic capacity evaluation, traffic scheme decision and quick maintenance methods, the short-term safety detection mode being mainly for professional transportation periodic detection requirements, and including short-term safety evaluation except for the above functions;

wherein the tunnel scan is set to the same cross section as the road sweep surface section, and the detection range has a certain degree of overlapping for data fusion calibration. The road load loading system may assist the dynamic deflection measurement of the bridge in addition to curved measurement. The roughness index obtained from road texture/flatness detection may be used for signal noise reduction during bridge detection.

2. The integrated automatic detection equipment according to claim 1, wherein the second test vehicle is a single degree of freedom vehicle.

3. The integrated automatic detection equipment according to claim 2, wherein the laser 3D scanning system is arranged on a top of the rear end of the tractor.

4. The integrated automatic detection equipment according to claim 3, wherein the road 3D detection system comprises a 3D camera sensor configured to acquire pavement 3D data, a distance control encoder configured to carry a vehicle speed and output mileage information, and a data storage acquisition system configured to record depth information and brightness information.

5. The integrated automatic detection equipment according to claim 4, wherein a plurality of 3D camera sensors are arranged linearly and equidistantly.

6. A data management system of the integrated automatic detection equipment according to claim 1, comprising
databases and a human-computer interaction,
wherein the databases comprise a knowledge database and a dynamic database, the knowledge database comprises diseases corresponding to detection data and key evaluation indexes, a degree classification, and treatment and maintenance plans, and the dynamic database comprises underlying data, structured data, and key index data; and
the human-computer interaction comprises a real-time traffic detection mode and a short-term safety detection mode.

7. The data management system according to claim 6, wherein the underlying data comprises image data and point cloud data;
the structured data comprises disease types and equivalent areas; and
the key index data comprises an overall deflection, international roughness indexes, and safety speed limits.

8. The data management system according to claim 7, wherein the real-time traffic detection mode comprises a detection data management, a traffic capacity evaluation, a traffic scheme decision, and quick maintenance methods.

9. The data management system according to claim 8, wherein the short-term safety detection mode comprises the detection data management, the traffic capacity evaluation, the traffic scheme decision, the quick maintenance methods, and a short-term safety evaluation.

* * * * *